United States Patent [19]

Tsujimura et al.

[11] Patent Number: 4,927,303

[45] Date of Patent: May 22, 1990

[54] BALL END MILL

[75] Inventors: Osamu Tsujimura; Masaaki Nakayama; Masayuki Okawa, all of Tokyo, Japan

[73] Assignee: Mitsubishi Metal Corporation, Tokyo, Japan

[21] Appl. No.: 412,495

[22] Filed: Sep. 26, 1989

[30] Foreign Application Priority Data

Sep. 27, 1988 [JP] Japan .......................... 63-126013[U]

[51] Int. Cl.$^5$ .......................... B23B 51/00; B23C 5/02
[52] U.S. Cl. ...................... 408/223; 407/42; 407/54; 408/227; 408/713
[58] Field of Search ............... 409/131, 63; 408/230, 408/231, 713, 223, 224, 227, 204; 407/42, 54, 48, 62, 60, 36, 113, 114

[56] References Cited

U.S. PATENT DOCUMENTS

| 4,252,480 | 2/1981 | Mizuno et al. | 408/223 |
| 4,525,110 | 6/1985 | Stojanovski | 407/48 X |
| 4,527,930 | 7/1985 | Harroun | 407/42 |
| 4,564,321 | 1/1986 | Kondo et al. | 408/224 |
| 4,808,045 | 2/1989 | Tsujimura et al. | 408/204 |
| 4,834,591 | 5/1989 | Tsujimura et al. | 407/113 |
| 4,844,669 | 7/1989 | Tsujimura et al. | 408/223 |

FOREIGN PATENT DOCUMENTS

| 111188 | 8/1979 | Japan | 407/54 |
| 65012 | 5/1980 | Japan | 407/42 |
| 157418 | 12/1980 | Japan | 407/42 |
| 134812 | 8/1986 | Japan | 407/42 |

Primary Examiner—William Briggs
Attorney, Agent, or Firm—Cushman, Darby & Cushman

[57] ABSTRACT

In a ball end mill, a rotational locus is described by cutting edges of respective throw-away tips mounted to a tool body. The cutting edge of one of the tips and the cutting edge of the adjacent tip overlap with each other, and the center of the overlapping portion is located at a position that is substantially 45° from a forward end of the cutting edge along a ¼ arc of the rotational locus therefrom. The overlapping length is ¼ to ⅓ of a diameter of the rotational locus in an arcuate length thereof. A planar section is formed at a side surface of at least one of the tips, which is located at a forward end of the tool body. The side surface is located adjacent a forward end of the cutting edge. A planar surface is formed at at least one of the tip pockets formed in the tool body, at a position facing toward the planar section. The planar surface is subject to a radial cutting force acting from the throw-away tip having the planar section. The planar section is abutted against the planar surface.

3 Claims, 3 Drawing Sheets

BALL END MILL

BACKGROUND OF THE INVENTION

The present invention relates to a ball end mill of the throw-away type, capable of uniformizing wear on the cutting edges of the tips.

For a ball end mill having a diameter relatively large, on the order of 30 mm to 60 mm, generally, a throw-away type is more widely used more than a solid type. FIGS. 13 through 15 illustrate an example of such a conventional ball end mill of the throw-away type (hereinafter referred to simply as "ball end mill"). An end mill body 1 has its forward end to which a pair of throw-away tips (hereinafter referred to simply as "tips") 2 and 2 are removably mounted. Each tip 2 is generally in the form of a triangle, and has an upper surface whose ridgelines are formed respectively into convexly arcuate cutting edges 2a. Each cutting edge 2a has an end which overlaps with an end of the adjacent cutting edge 2a in a rotational locus of the radially outward cutting edges 2a of the respective tips 2 and 2, to form substantially a ¼ arc of the rotational locus.

For this ball end mill, the overlapping length 1 of the cutting edges 2a and 2a is short, being on the order of 1 mm to 2 mm in the arcuate length of the rotational locus. Accordingly, wear on each cutting edge 2a is severe. For this reason, the conventional ball end mill has such a drawback that it cannot cope with high output processing.

A ball end mill shown in FIGS. 16 through 20 has been proposed, which can solve the above drawback. The ball end mill illustrated in these figures has a pair of tips 3 and 4 which are mounted to an end mill body 1. Each of the tips 3 and 4 is substantially in the form of an elliptical configuration. An entire periphery of an upper surface of each of the cutting edges 3 and 4 is formed into a pair of cutting edges 3a and 3a, 4a and 4a. An overlapping length 1 between the cutting edges 3a and 4a is set large.

However, the above ball end mill has the following various drawbacks:

(1) The tips 3 and 4 increase in their outer dimension extremely, which results in an increase in their cost.

(2) The contact length of the tips 3 and 4 with a workpiece increases, so the cutting resistance increases.

(3) Since the tips 3 and 4 are large in size, a pair of tip mounting seats 5 and 5 formed in the end mill body 1 must inevitably increase in size in order to cause the tips 3 and 4 to rest respectively on the tip mounting seats 5 and 5. Thus, the tool rigidity of the end mill body 1 decreases.

SUMMARY OF THE INVENTION

It is an object of the invention to provide a ball end mill capable of increasing efficiency of a cutting operation and capable of reducing the size of tips.

According to the invention, there is provided a ball end mill comprising:

a tool body rotatable around an axis and having a plurality of tip pockets formed in a forward end of the tool body, each of the tip pockets having a wall surface facing toward a rotational direction of the tool body;

a plurality of throw-away tips each having at least one arcuate cutting edge, the arcuate cutting edges of the respective throw-away tips describing a rotational locus when the tool body rotates around the axis;

a plurality of clamp bolts each of which is removably fastened to the wall surface of a corresponding tip pockets through a corresponding throw-away tips such that an end of the throw-away tip and an adjacent end of the adjacent throw-away tip in the rotational locus of the throw-away tips overlap with each other to form substantially a ¼ arc of the rotational locus;

the cutting edge of one of the throw-away tips and the cutting edge of the adjacent throw-away tip overlapping with each other, the center of the overlapping being located at a position that is substantially 45° from a forward end of the cutting edge along a ¼ arc of the rotational locus therefrom, and the overlapping length being ¼ to ⅓ of a diameter of the rotational locus in an arcuate length thereof;

a planar section formed at a side surface of at least one of the plurality of throw-away tips, which is located at the forward end of the tool body, the side surface being located adjacent the forward end of the cutting edge of the throw-away tip; and a planar surface formed at at least one of the tip pockets at a position facing toward the planar section, the planar surface being subject to a radial cutting force acting from the throw-away tip having the planar section, the planar section being abutted against the planar surface.

Of each cutting edge of the ball end mill, portions most participating in cutting are the forward end of the cutting edge and the vicinity of the position that is 45° along the ¼ arc of the rotational locus from the forward end of the cutting edge. At such portions, the cutting edge is liable to wear, and breakage or the like occurs frequently. Particularly, as shown in FIGS. 7 through 12, in die sinking or die milling processing of a mold, there are many cases in which a work undulating complicatedly is being milled. Thus, as seen from FIGS. 7 through 12, the portion of the cutting edge that is located at 45° from the forward end of the cutting edge is always used or utilized. In view of this, the inventors of this application have conducted various experiments. As a result of the experiments, it has been found that the range of from ¼ to ⅓ of the diameter of the rotational locus described by the cutting edges receives the burden of the wear, centering around the position that is 45° from the forward end of the cutting edge along the ¼ arc of the rotational locus. Therefore, a burden on each cutting edge can be reduced by overlapping the cutting edges with each other in the above range, making it possible to reduce wear, breakage, and the like of each cutting edge. On the other hand, the tips are sufficient if their respective cutting edges overlap with each other only in the above range, making it possible to reduce the size of each tip.

BRIEF DESCRIPTION OF THE DRAWINGS

FIG. 17 is a top plan view of one of a pair of tips shown in FIG. 16;

FIG. 18 is a side elevational view as viewed from the arrow XVIII in FIG. 17;

FIG. 19 is a top plan view of the other tip illustrated in FIG. 16; and

FIG. 20 is a side elevational view as viewed from the arrow XX in FIG. 19.

DETAILED DESCRIPTION

Figure 1:
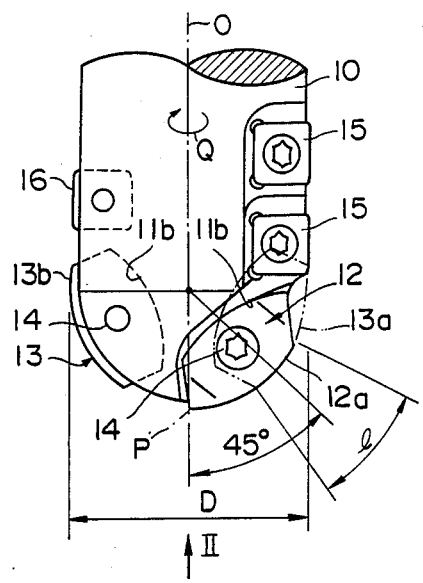
FIG. 1 is a side elevational view of a ball end mill according to an embodiment of the invention.
Figure 2:
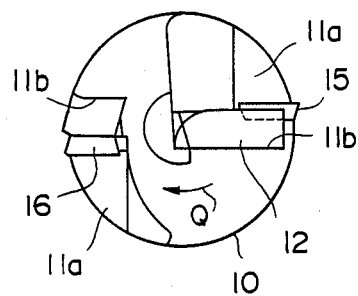
FIG. 2 is a view as viewed from the arrow II in FIG. 1.

Referring to FIGS. 1 and 2, there is shown a ball end mill according to an embodiment of the invention. The ball end mill comprises an end mill body 10 which is in the form of a circular cylinder and which rotates about an axis O as indicated by the arrow Q in FIGS. 1 and 2. The end mill body 10 has its forward end which is formed with a plurality of, i.e., a pair of tip pockets 11a and 11a. A tip mounting seat 11b is formed at a wall surface of each tip pocket 11a which faces toward a rotational direction of the end mill body 10 at the time the latter rotates about the axis O. A pair of tips 12 and 13 are removably mounted respectively to the tip mounting seats 11b and 11b by respective clamp bolts 14 and 14. The clamp bolts 14 and 14 extend respectively through the tips 12 and 13 and are fastened respectively to the wall surfaces of the tip pockets 11a and 11a.

Figure 3:
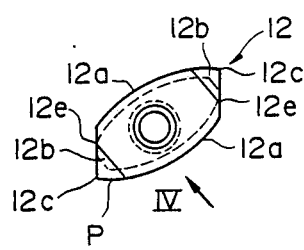
FIG. 3 is a top plan view of one of a pair of tips illustrated in FIGS. 1 and 2.
Figure 4:
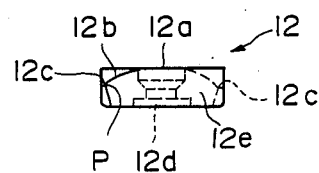
FIG. 4 is a side elevational view as viewed from the arrow IV in FIG. 3.

One of the tips 12 is substantially in the form of a parallelogram by appearance, as illustrated in FIGS. 3 and 4. A pair of arcuate cutting edges 12a and 12a opposite to each other are formed respectively at ridgelines that are long sides of an upper surface of the tip 12. Further, a pair of arcuate cutting faces 12b and 12b each in the form of a convex curved surface as viewed from the arrow IV in FIG. 3 are formed respectively on the opposite ends of the upper surface of the tip 12. A pair of small cutting edges 12c and 12c are formed respectively at intersections between the cutting faces 12b and 12b and the side surfaces of the tip 12. Moreover, a pair of planar sections 12e and 12e are formed respectively on the side surfaces of the tip 12 adjacent the forward ends of the arcuate cutting edges 12a and 12a. A recess 12d is formed in a lower surface of the tip 12, and a projection (not shown) formed on the tip mounting seat 11b is adapted to be fitted in the recess 12d. The tip 12 is mounted on the tip mounting seat 11b such that the recess 12d engages the projection on the tip mounting seat 11b, and the planar section 12e is abutted against a planar surface formed on the tip mounting seat 11b at a position facing toward the planar section 12a.

Figure 5:
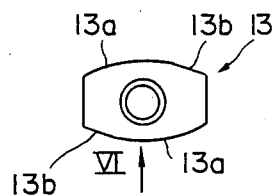
FIG. 5 is a top plan view of the other tip shown in FIG. 1.
Figure 6:
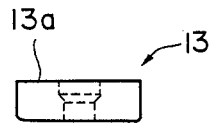
FIG. 6 is a side elevational view as viewed from the arrow VI in FIG. 5.
Figure 7:
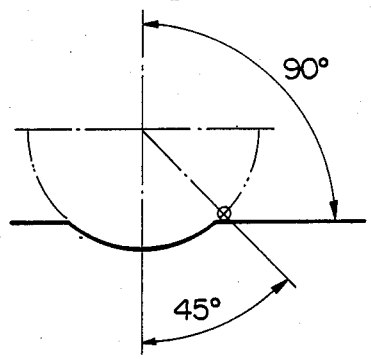
FIGS. 7 through 12 are cross-sectional side elevational views for explanation of the relationship between an angle of a work and a used portion of the cutting edge.
Figure 8:
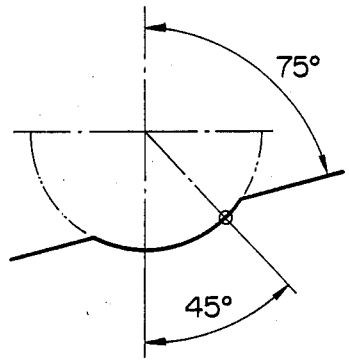
Figure 9:
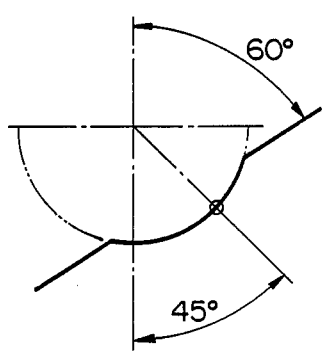
Figure 10:
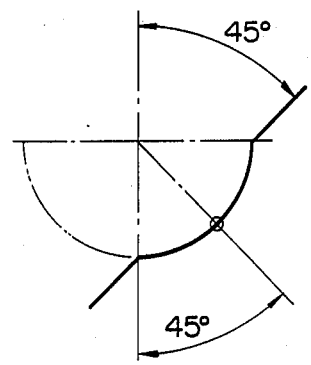
Figure 11:
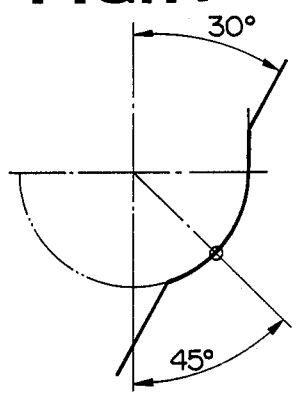
Figure 12:
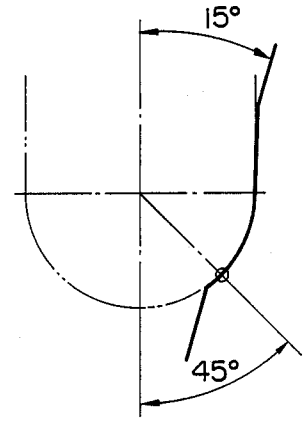
Figure 13:
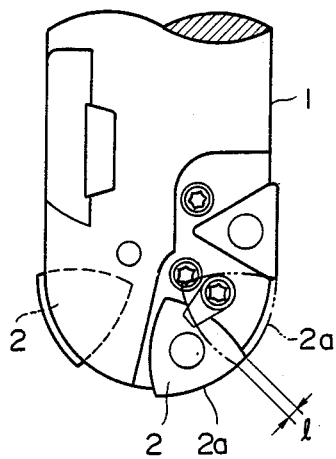
FIG. 13 is a side elevational view of a conventional ball end mill.
Figure 16:
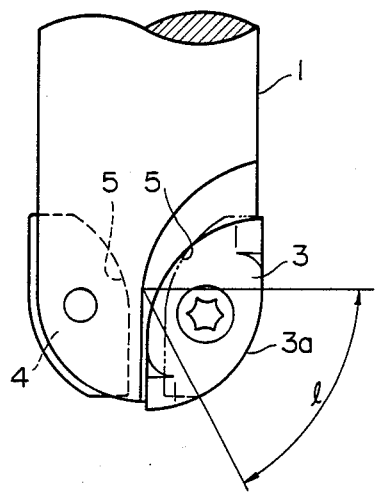
FIG. 16 is a side elevational view of another conventional ball end mill.
Figure 14:
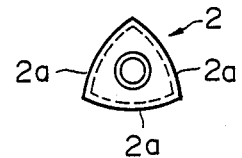
FIG. 14 is a top plan view of one of a pair of tips illustrated in FIG. 13.
Figure 15:
FIG. 15 is a side elevational view of the tip shown in FIG. 14.
Figure 15:
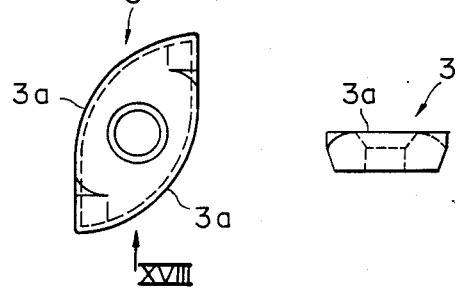
Figure 15:
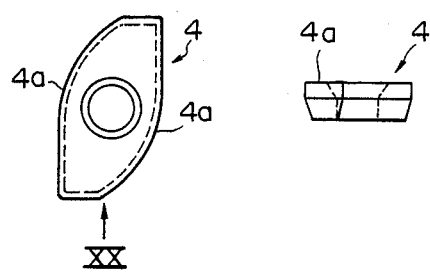

As illustrated in FIGS. 5 and 6, the other tip 13 is substantially in the form of a rectangle by appearance. A pair of arcuate cutting edges 13a and 13a opposite to each other are formed at ridgelines which are long sides of an upper surface of the tip 13. A straight or linear cutting edge 13b having a predetermined length is formed at a rearward end of each of the arcuate cutting edges 13a and 13a of the tip 13.

The tips 12 and 13 are arranged such that the small cutting edge 12c of one of the tips (tip 12, for example) intersects with the axis O of the end mill body 10, the other tip (tip 13, for example) is disposed adjacent to the proximal end of the end mill body 10, and the ends of the respective cutting edges 12a and 13a overlap with each other in the rotational locus to form substantially a ¼ arc. The cutting edges 12a and 13a overlap with each other, and the center of overlapping portion is located at a position that is 45° from a forward end P of the cutting edge 12a, that is, from the intersection point between the cutting edge 12a and the small cutting edge 12c along the ¼ arc. The overlapping length l is ¼ to ⅓ of a diameter D of the rotational locus in the arcuate length thereof. In this connection, the center of the overlapping length l may not be the position that is strictly 45° from the forward end P of the cutting edge 12a, but the center of the overlapping length l is allowed to have a range of ±5° with respect to 45°.

Further, a pair of tips 15 and 15 spaced from each other in the direction of the axis O are mounted to the side of the end mill body 10 at a position adjacent to the proximal end of the end mill body 10 rather than the tip 12. A tip 16 is also mounted adjacent to the proximal end of the other tip 13. The forward end of the tip 15 adjacent to the forward end of the end mill body 10 overlaps with the linear cutting edge 13b of the tip 13 in the rotational locus, and the ends of the respective tips 15 and 15 and 16 overlap with each other in the rotational locus, to cut a side wall of a work without gap.

In the ball end mill arranged as described above, the ends of the cutting edges 12a and 13a overlap with each other, centering around the position that is 45° along the ¼ arc of the rotational locus from the forward end of the cutting edge 12a. Accordingly, the burden can be reduced on the portions of the cutting edges 12a and 13a which are most exposed to the cutting processing, making it possible to reduce the wear and breakage on the cutting edges 12a and 13a and making it possible to realize the high feed cutting, so that the cutting operation can increase in efficiency. Thus, the ball end mill is extremely useful and durable when used for die sinking of a mold which is violent in undulation and which is complicated. Furthermore, since only the portions of the respective requisite cutting edges 12a and 13a overlap with each other, the tips 12 and 13 can be reduced in size and can be simplified in configuration, as shown in FIGS. 3 through 6, making it possible to reduce the manufacturing cost of the tips 12 and 13, hence, the manufacturing cost of the ball end mill.

Moreover, the planar section 12e is formed on the side surface of the tip 12 adjacent the forward end of the arcuate cutting edge 12a thereof, and the planar section 12e is mounted to the tip mounting seat 11b in abutment with the planar portion thereof formed at the position facing toward the planar section 12e. Accordingly, there is no fear that, at cutting, the tip 12 moves radially of the end mill body 10 by the cutting resistance, and the small cutting edge 12c projects remote from the axis O to the end mill body 10, so that breakage or chipping or the like occurs.

In connection with the above embodiment, the cutting edge in the form of the ¼ arc of the rotational locus is formed by the pair of tips 12 and 13. It is of course, however, that the same advantages are obtained if the cutting edge is formed by three or more tips.

As described above, the ball end mill according to the invention is arranged such that the cutting edges overlap with each other and the center of the overlapping is located at the position that is substantially 45° from the forward end of the cutting edge along the ¼ arc of the rotational locus. The overlapping length is ¼ to ⅓ of the diameter of the rotational locus in the arcuate length thereof. The planar section is formed at the side surface of at least one of the plurality of throw-away tips, which is located at the forward end of the end mill body or a tool body. The side surface is located adjacent the forward end of the cutting edge of the throw-away tip. The planar surface is formed at one of the tip pockets at a position facing toward the planar section. The planar surface is subject to a radial cutting force acting from the throw-away tip having the planar section. The planar section is abutted against the planar surface. With the arrangement of the ball end mill, the following advantages are obtained. That is, a burden is reduced on the portions of each cutting edge which are most offered to the cutting processing, making it possible to reduce the wear and breakage of the cutting edge. Moreover, the portion of the cutting edge located at the forward end of the tool body, which portion is located adjacent the axis of the end mill, can be prevented from being broken, so that the cutting at high feed speed can be realized, making it possible to obtain high efficiency of the cutting operation. Thus, the ball end mill is extremely useful and durable in use of die sinking processing of a mold which is violent in undulation and which is complicated. Further, since only the portions of the respective requisite cutting edges overlap with each other, the tips can be reduced in size and can be simplified in configuration, making it possible to reduce the manufacturing cost of the tips, hence, the manufacturing cost of the ball end mill.

What is claimed is:

1. A ball end mill comprising:
   a tool body rotatable around an axis and having a plurality of tip pockets formed in a forward end of said tool body, each of said tip pockets having a wall surface facing toward a rotational direction of said tool body;
   a plurality of throw-away tips each having at least one arcuate cutting edge, the arcuate cutting edges of the respective throw-away tips describing a rotational locus when said tool body rotates around said axis;
   a plurality of clamp bolts each of which is removably fastened to the wall surface of a corresponding tip pocket through a corresponding throw-away tip such that an end of the throw-away tip and an adjacent end of the adjacent throw-away tip in said rotational locus of said throw-away tips overlap with each other to form substantially a ¼ arc of said rotational locus;
   the cutting edge of one of said throw-away tips and the cutting edge of the adjacent throw-away tip overlapping with each other, the center of the overlapping being located at a position that is substantially 45° from a forward end of the cutting edge along a ¼ arc of said rotational locus therefrom, and the overlapping length being ¼ to ⅓ of a diameter of said rotational locus in an arcuate length thereof;
   a planar section formed at a side surface of at least one of said plurality of throw-away tips, which is located at the forward end of said tool body, said side surface being located adjacent the forward end of the cutting edge of the throw-away tip; and
   a planar surface formed at at least one of said tip pockets at a position facing toward said planar section, said planar surface being subject to a radial cutting force acting from the throw-away tip having said planar section, said planar section being abutted against said planar surface.

2. A ball end mill according to claim 1, wherein said overlapping length has a center which has an allowable range of ±5° with respect to said 45°.

3. A ball end mill according to claim 1, wherein each of said throw-away tips has a surface whose pair of ridgelines are formed respectively into a pair of cutting edges, the pair of cutting edges being located opposite to each other.

* * * * *